(12) United States Patent
Kim et al.

(10) Patent No.: US 9,910,329 B2
(45) Date of Patent: Mar. 6, 2018

(54) LIQUID CRYSTAL DISPLAY DEVICE FOR CANCELLING OUT RIPPLES GENERATED THE COMMON ELECTRODE

(71) Applicant: LG DISPLAY CO., LTD., Seoul (KR)

(72) Inventors: Kyujin Kim, Paju-si (KR); Ooksang Yoo, Daejeon (KR); Taehun Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 157 days.

(21) Appl. No.: 14/839,467

(22) Filed: Aug. 28, 2015

(65) Prior Publication Data

US 2016/0070147 A1     Mar. 10, 2016

(30) Foreign Application Priority Data

Sep. 5, 2014 (KR) ......................... 10-2014-0119344

(51) Int. Cl.
*G02F 1/1368* (2006.01)
*G02F 1/1362* (2006.01)
*G09G 3/36* (2006.01)

(52) U.S. Cl.
CPC ...... *G02F 1/136213* (2013.01); *G02F 1/1368* (2013.01); *G02F 1/136286* (2013.01); *G09G 3/3614* (2013.01); *G09G 3/3655* (2013.01); *G09G 3/3688* (2013.01); *G09G 2300/0413* (2013.01); *G09G 2300/0426* (2013.01); *G09G 2300/0876* (2013.01); *G09G 2310/0297* (2013.01); *G09G 2310/066* (2013.01); *G09G 2370/08* (2013.01)

(58) Field of Classification Search
CPC ............. G02F 1/1343; G02F 1/136213; G02F 1/1368; G02F 1/136286; G09G 3/36; G09G 3/3614; G09G 3/3688; G09G 3/3655; G09G 2300/0413; G09G 2300/0426; G09G 2300/0876; G09G 2310/066; G09G 2370/08; G09G 2310/0297
USPC ........................... 345/87–100, 204, 211–212
See application file for complete search history.

(56) References Cited

U.S. PATENT DOCUMENTS

| | | | |
|---|---|---|---|
| 5,946,068 A | * | 8/1999 | Lee ...................... G09G 3/3611 345/96 |
| 2003/0123006 A1 | * | 7/2003 | Jeong .................... G02F 1/1362 349/139 |
| 2004/0196241 A1 | | 10/2004 | Lee et al. |

(Continued)

FOREIGN PATENT DOCUMENTS

EP     2 182 508 A1     5/2010

*Primary Examiner* — Jennifer Mehmood
*Assistant Examiner* — James Nokham
(74) *Attorney, Agent, or Firm* — Birch, Stewart, Kolasch & Birch, LLP

(57) ABSTRACT

A liquid crystal display (LCD) device according to an embodiment includes a liquid crystal panel in which a gate line, a dummy data line, and a data line are disposed, a timing controller configured to generate compensation data, a data driver configured to generate a compensation data voltage on the basis of the compensation data, provide the generated compensation data voltage to the dummy data line, and provide a data voltage for displaying an image to the data line, a common electrode configured to provide a common voltage to pixels of the liquid crystal panel, and a compensation capacitor positioned outside of a pixel array of the liquid crystal panel and charged upon receiving the compensation data voltage.

7 Claims, 10 Drawing Sheets

(56) References Cited

U.S. PATENT DOCUMENTS

| | | | |
|---|---|---|---|
| 2005/0243044 A1* | 11/2005 | Kang | G02F 1/136286 |
| | | | 345/87 |
| 2006/0244704 A1 | 11/2006 | JaeHun | |
| 2007/0115235 A1* | 5/2007 | Park | G09G 3/3611 |
| | | | 345/93 |
| 2007/0206136 A1 | 9/2007 | Lin | |
| 2008/0001902 A1* | 1/2008 | Kim | G09G 3/3648 |
| | | | 345/100 |
| 2008/0094388 A1 | 4/2008 | Yamazaki | |
| 2008/0117148 A1 | 5/2008 | Tu | |
| 2008/0165111 A1* | 7/2008 | Pai | G09G 3/3648 |
| | | | 345/100 |
| 2008/0278471 A1 | 11/2008 | Huang | |
| 2008/0291144 A1 | 11/2008 | Chen | |
| 2010/0110058 A1* | 5/2010 | Moh | G09G 3/3655 |
| | | | 345/211 |
| 2011/0080387 A1* | 4/2011 | Park | G09G 3/3611 |
| | | | 345/204 |
| 2014/0176839 A1 | 6/2014 | Oh et al. | |

\* cited by examiner

Fig. 10
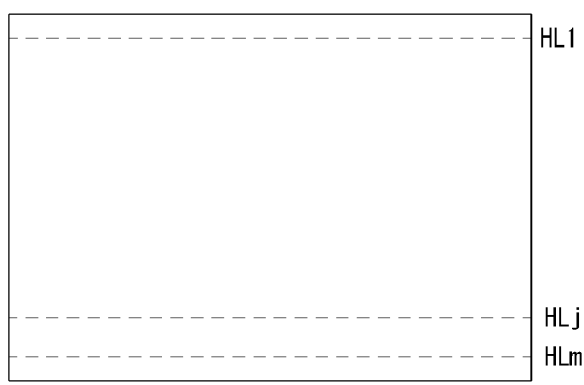
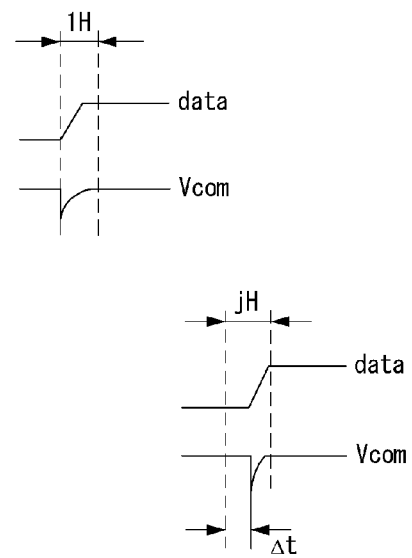

LIQUID CRYSTAL DISPLAY DEVICE FOR CANCELLING OUT RIPPLES GENERATED THE COMMON ELECTRODE

This application claims the priority benefit of Korean Patent Application No. 10-2014-0119344 filed on Sep. 5, 2014, the entire contents of which is incorporated herein by reference for all purposes as if fully set forth herein.

BACKGROUND OF THE INVENTION

Field of the Invention

This document relates to a liquid crystal display device.

Related Art

An active matrix driving type liquid crystal display displays video using a thin film transistor (TFT) as a switching element. Compared with cathode ray tubes (CRTs), the liquid crystal display may be reduced in size so as to be applied to televisions and display devices of portable information devices, office machines, computers, etc., rapidly replacing CRTs.

In a liquid crystal display, pixels are formed as data lines and gate lines intersect each other, and include thin film transistors (TFTs) connected to the intersections of the data lines and the gate lines. In response to a gate pulse from a gate line, each TFT supplies a data voltage supplied through a data line to a pixel electrode of a liquid crystal cell. Driven by an electric field generated according to a voltage difference between a voltage of a pixel electrode and a common voltage Vcom applied to a common electrode, the liquid crystal cell adjusts an amount of light passing through a polarizing plate. A storage capacitor is connected to the pixel electrode of the liquid crystal cell to maintain a voltage of the liquid crystal cell.

The common voltage Vcom applied to the common electrode may cause a ripple phenomenon due to electrical coupling with the pixel electrode. The ripple phenomenon of the common voltage Vcom is proportional to variations of a data voltage over time. Thus, in an inversion scheme driven by varying the polarity of the data voltage, a variation of the data voltage is so large that the ripple phenomenon of the common voltage Vcom becomes severe the moment a polarity of the data voltage is changed. The ripple phenomenon of the common voltage Vcom causes a line dim phenomenon in a horizontal direction, degrading display quality.

SUMMARY OF THE INVENTION

According to an aspect of the present disclosure, a liquid crystal display (LCD) device includes a liquid crystal panel in which a gate line, a dummy data line, and a data line are disposed; a timing controller configured to generate compensation data; a data driver configured to generate a compensation data voltage on the basis of the compensation data and provide the generated compensation data voltage to the dummy data line, and provide a data voltage for displaying an image to the data line; a common electrode configured to provide a common voltage to pixels of the liquid crystal panel; and a compensation capacitor positioned outside of a pixel array of the liquid crystal panel and charged upon receiving the compensation data voltage. The compensation capacitor can be charged by the compensation data voltage provided during a polarity change interval in which a polarity of the data voltage is reversed, and cancels out ripples generated in the common electrode by a current flow formed in a direction toward the common electrode during the voltage charge process.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 10 is a view illustrating ripple cancellation of a common voltage by reflecting data voltage delay according to an embodiment of the present invention.

DETAILED DESCRIPTION OF THE EMBODIMENTS

Figure 1:
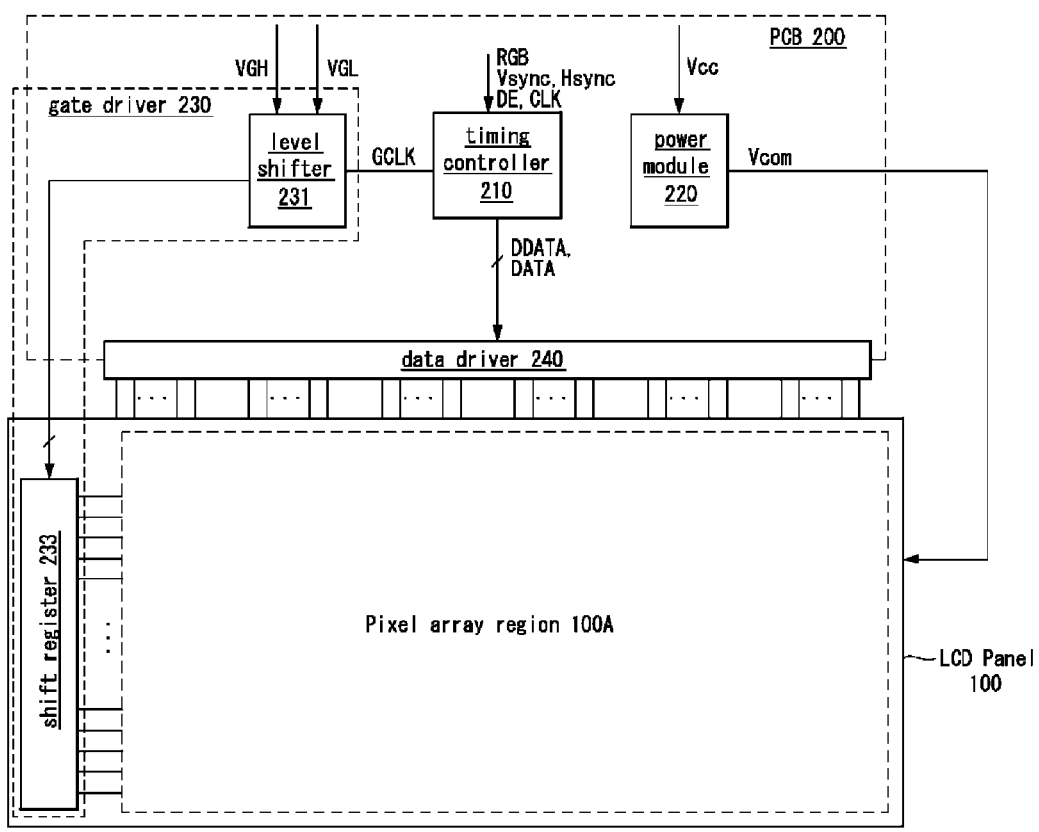
FIG. 1 is a view illustrating a configuration of a liquid crystal display (LCD) device according to an embodiment of the present invention.

Hereinafter, embodiments will be described in detail with reference to the accompanying drawings. Throughout the specification, the like reference numerals denote the substantially same elements. In describing the present invention, if a detailed explanation for a related known function or construction is considered to unnecessarily divert the gist of the present invention, such explanation will be omitted but would be understood by those skilled in the art.

Names of elements used in the following description are selected for the description purpose and may be different from those of actual products.

FIG. 1 is a view illustrating a configuration of a liquid crystal display (LCD) device according to an embodiment of the present invention.

Referring to FIG. 1, the LCD device according to an embodiment of the present invention includes a liquid crystal panel 100, a timing controller 210, a power module 220, a gate driver 230, and a data driver 240. All of the components of the LCD device in this and other embodiments are operatively coupled and configured.

The liquid crystal panel 100 includes a thin film transistor (TFT) array substrate in which a TFT array is formed and a color filter substrate in which color filters are formed, and a liquid crystal layer is formed between the TFT array substrate and the color filter substrate. In the liquid crystal panel 100, a region of the TFT array substrate in which pixels P are arranged will be defined as a pixel array region 100A.

Figure 2:
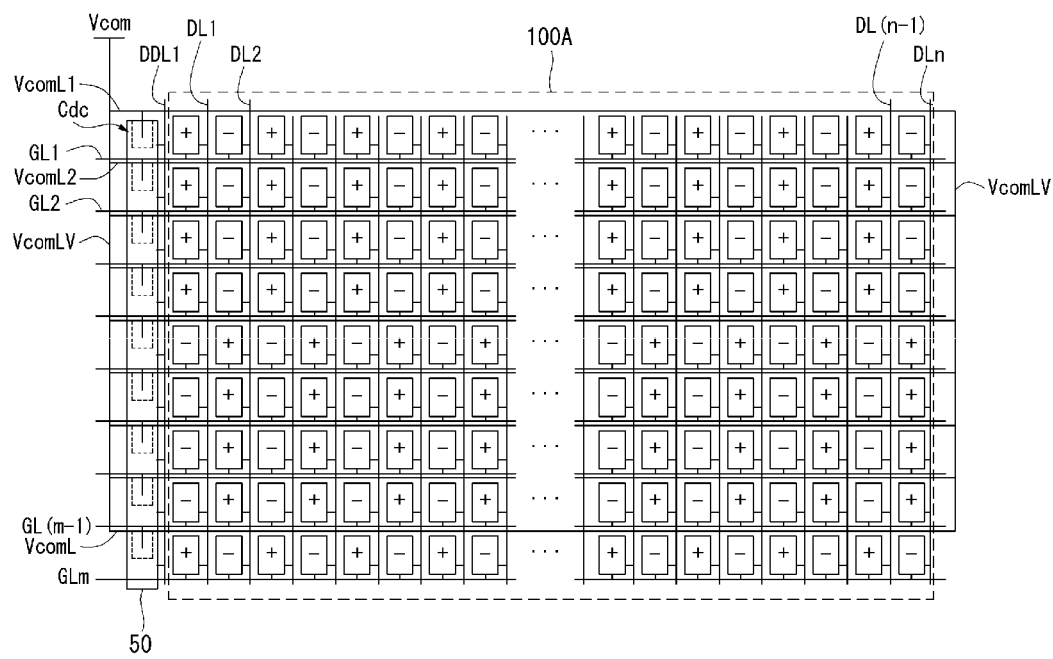
FIG. 2 is a view illustrating a pixel array region according to a first embodiment of the present invention.

As illustrated in FIG. 2, in the TFT array substrate of the liquid crystal panel 100 according to a first embodiment, pixels P defined by gate lines GL1 to GLm and data lines DL1 to DLn arranged vertically and horizontally are arranged in a matrix form. A dummy data line DDL and compensation capacitors Cdc are formed to be parallel to the first data line on one side of the pixel array region 100A.

A common line includes horizontal lines VcomL1 to VcomLm and vertical common lines VcomLV. A common voltage Vcom generated by the power module 220 is supplied to a common electrode by way of a common line. The horizontal common lines VcomL1 to VcomLm are disposed to be parallel to the gate lines GL1 to GLm. The vertical common line VcomLV is disposed vertically in a position outside of the pixel array region 100A and connects the power module 200 and the horizontal common lines VcomL1 to VcomLm. The vertical common line VcomLV and the horizontal common lines VcomL1 to VcomLm may have a mesh form.

Each compensation capacitor Cdc is formed in a position outside of the pixel array region 100A. Details of a structure and a function of the compensation capacitors Cdc will be described hereinafter.

The dummy data line DDL is formed outside of the pixel array region 100A and receives a compensation data voltage ADDATA from the data driver 240.

The timing controller 210 receives digital video data RGB from an external hole (not shown), and receives timing signals such as a vertical synchronization signal Vsync, a horizontal synchronization signal Hsync, a data enable signal Data Enable (DE), and a main clock CLK. The timing controller 210 transmits the digital video data RGB to source drive ICs 240. The timing controller 210 generates a source timing control signal for controlling an operation timing of the data driver 240 and a gate timing control signal GCLK for controlling an operation timing of the gate driver 230 by using the timing signals Vsync, Hsync, DE, and CLK.

Also, the timing controller 210 generates compensation data provided to the dummy data line DDL. The compensation data is output as a compensation data voltage through the data driver 240. The compensation data voltage is charged in a compensation capacitor Cdc to suppress ripples of the common voltage Vcom. Details thereof will be described hereinafter.

The power module 220 receives a source voltage VCC and outputs a gate high voltage VGH, a gate low voltage VGL, a high potential voltage VDD, and a common voltage Vcom. The gate high voltage VGH is a high level voltage of a scan pulse supplied to the gate line GL, and the gate low voltage VGL is a low level voltage of a scan pulse supplied to the gate line GL. The common voltage Vcom may be a voltage level within a range from a low potential voltage to a high potential voltage VDD, and for example, the common voltage may have a potential of an middle level potential HVDD between the low potential voltage and the high potential voltage VDD.

The GIP-type gate driver 230 includes a level shifter 231 and a shift register 233 mounted on a PCB 200.

The level shifter 231 receives a driving voltage such as a gate high voltage VGH or a gate low voltage VGL, receives a start signal ST and a gate clock signal GCLK from the timing controller 210, and outputs a start pulse VST and a clock signal CLK swung between the gate high voltage VGH and the gate low voltage VGL. The clock signals CLK output from the level shifter 2312 are sequentially phase-shifted and transmitted to the shift register 233 formed in the display panel 100

The shift register 233 is connected to the gate lines GL of the display panel 100. The shift register 233 includes a plurality of dependently connected stages. The shift register 233 shifts a start pulse VST input from the level shifter 231 according to the clock signal CLK and sequentially supplies a gate pulse to the gate lines GL.

The data driver 240 receives digital video data RGB and compensation data DDTA from the timing controller 210. In response to a source timing control signal from the timing controller 210, the data driver 240 converts the digital video data RGB into a positive polarity/negative polarity analog data voltage and subsequently supplies the data voltage to the data lines DL1 to DLn of the display panel 100 such that the data voltage is synchronized with a gate pulse. The data driver 240 converts the compensation data DDATA into a compensation data voltage ADDATA and subsequently supplies the compensation data voltage ADDATA to the dummy data line DDL.

Figure 3:
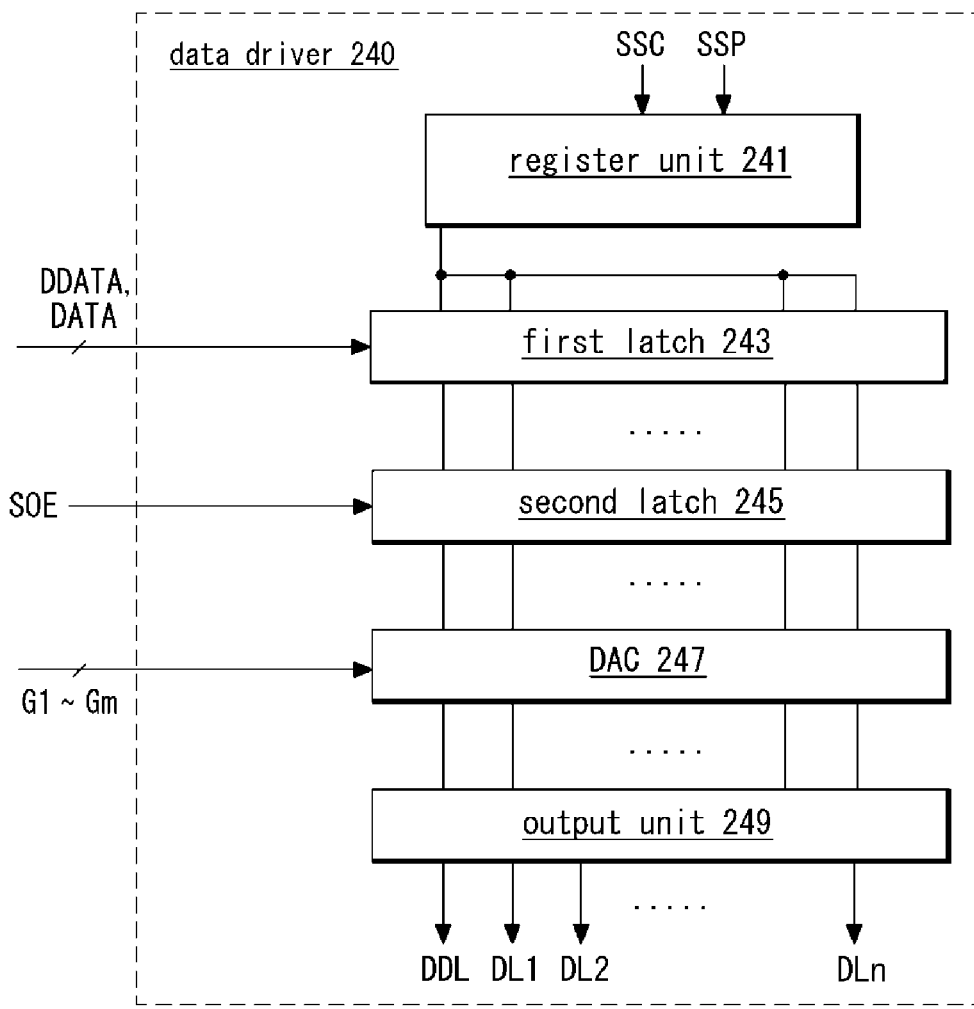
FIG. 3 is a view illustrating a configuration of a data driver according to an embodiment of the present invention.

To this end, as illustrated in FIG. 3, the data driver 240 includes a register unit 241, a first latch 243, a second latch 245, a digital-to-analog converter (DAC) 247, and an output unit 249.

The register unit 241 samples RGB digital video data bits of an input image using data control signals SSC and SSP provided from the timing controller 210, and provides the sampled bits to the first latch 243. Also, the register unit 241 provides the compensation data DDATA provided from the timing controller 210 to the first latch 243.

The first latch 243 samples and latch the compensation data DDATA and the digital video data bits according to a clock sequentially provided from the register unit 241, and simultaneously outputs the latched compensation data DDATA and the data DATA. The second latch 235 latches the compensation data DDATA and the data provided from the first latch 243, and simultaneously outputs the latched data in response to a source output enable signal SOE.

The DAC 247 converts the compensation data DDATA and the video data input from the second latch 245 into a gamma compensation voltage GMA to generate an analog compensation data voltage ADDATA and a video data voltage.

The output unit 249 provides the analog compensation data voltage ADDATA output from the DAC 247 to the dummy data line DDA and provides the data voltage ADATA to the data lines DL1 to DLn during a low logical period of the source output enable signal SOE.

Figure 4:
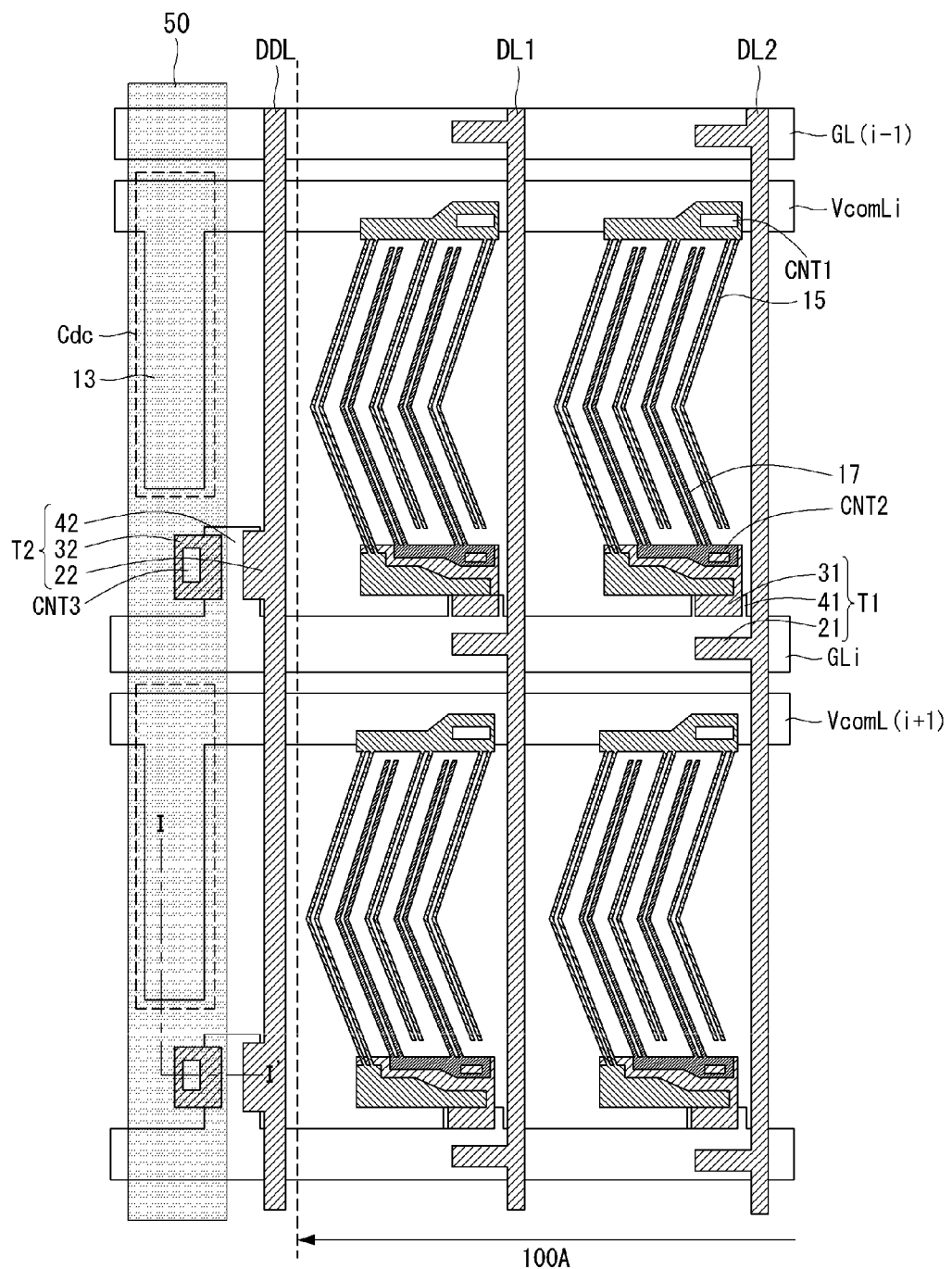
FIG. 4 is a view illustrating a planar structure of pixels and compensation capacitors according to an embodiment of the present invention.
Figure 5:
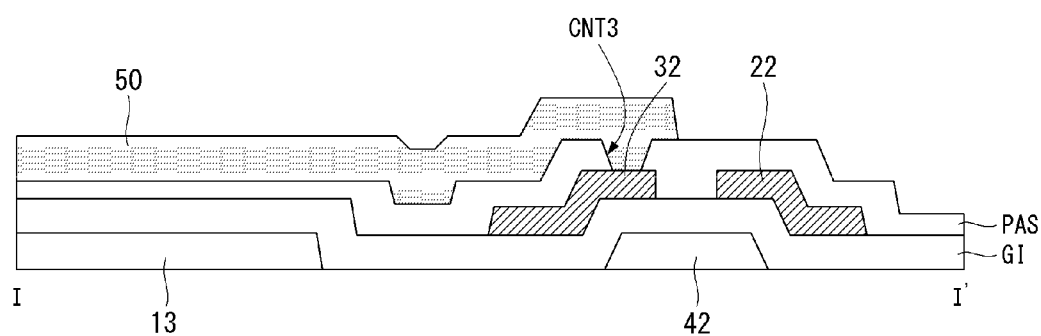
FIG. 5 is a cross-sectional view taken along line I-I' of FIG. 4.
Figure 6:
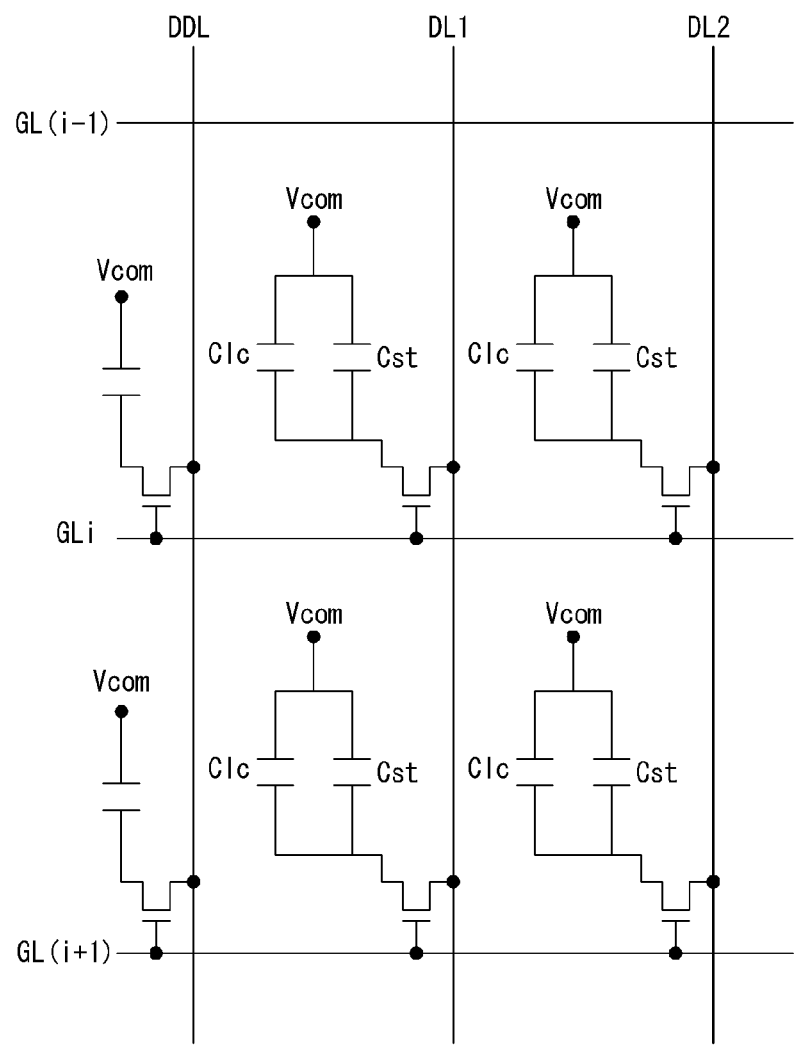
FIG. 6 is an equivalent circuit diagram of the pixels and the compensation capacitors of FIG. 4.

FIG. 4 is a plan view illustrating pixels P and compensation capacitors Cdc, FIG. 5 is a cross-sectional view taken along line I-I' of FIG. 4, and FIG. 6 is an equivalent circuit diagram of FIG. 4.

The compensation capacitor Cdc and the pixel P will be described with reference to FIGS. 4 through 6. Gate lines GL(i−1) to GL(i), horizontal common lines VcomLi to VcomL(i+1), and a dummy common electrode 13 are formed on a substrate. In the following descriptions, when it is not necessary to distinguish between the horizontal common lines and the vertical gate lines according to positions, the horizontal common lines and the vertical gate lines will be generally described as a horizontal common line VcomL and a gate line GL. Also, the same components included in the pixels P or the compensation capacitors Cdc will also be described using the same reference numeral.

Each horizontal common line VcomL is formed to be parallel to the gate line GL. The dummy common electrode 13 is formed to be parallel to the gate line GL. The dummy common electrode 13 is branched from one side of the horizontal common line VcomL and formed in a vertical direction. First gate electrodes 41 and second gate electrodes 42 branched in a vertical direction are formed on one side of the gate line GL. The second gate electrode 42 is branched from outside of a pixel array region 100A. The gate line GL, the horizontal common lines VcomLi to VcomL(i+1), and the dummy common electrode 13 may be formed of a gate metal material through the same process.

A gate insulating layer GI is formed on the entire upper portion of the gate line GL, the horizontal common line VcomL, and the dummy common electrode 13.

A data line DL, a dummy data line DDL, first and second drain electrodes 21 and 22, and first and second source electrodes 31 and 32 are formed on the gate insulating layer GI.

The first drain electrode 21 is formed to protrude from the data line DL in a region where the first gate electrode 41 is positioned. The first source electrode 31 is formed to be adjacent to the first drain electrode 21. The first gate electrode 41, the first drain electrode 21, and the first source electrode 31 form a first transistor T1. In response to a gate pulse provided from the gate line GL, the first transistor T1 provides a data voltage provided from the data line DL to a pixel electrode 17.

The dummy data line DDL includes the second drain electrode 22 protruding from a region where the second gate electrode 42 is positioned. The second source electrode 32 is formed to be adjacent to the second drain electrode 22. The second gate electrode 42, the second drain electrode 22, and the second source electrode 32 form a second transistor T2, and in response to a gate pulse provided from the gate line GL, the second transistor T2 provides a compensation data voltage provided from the dummy data line DDL to a metal pattern 50.

A passivation layer PAS is formed on the data line DL, the dummy data line DDL, the first and second drain electrodes 21 and 22, and the first and second source electrodes 31 and 32.

A pixel electrode 17, a common electrode 15, and the metal pattern 50 are formed on the passivation layer PAS. The pixel electrode 17, the liquid crystal layer, and the common electrode 15 form a liquid crystal capacitor Clc to display a gray level corresponding to a data voltage. The storage capacitor Cst stores a data signal during one frame to constantly maintain a voltage of the pixel electrode.

The metal pattern 50 is formed to face the dummy common electrode 13, and the dummy common electrode 13 and the metal pattern 50 form the compensation capacitor Cdc with an insulating layer interposed therebetween. The compensation capacitor Cdc charges a compensation data voltage provided from the dummy data line DDL and cancel out ripples of the common voltage Vcom during the process of charging the compensation data voltage.

A method for enhancing ripples of the common voltage Vcom by the compensation capacitor Cdc will be described.

Figure 7:
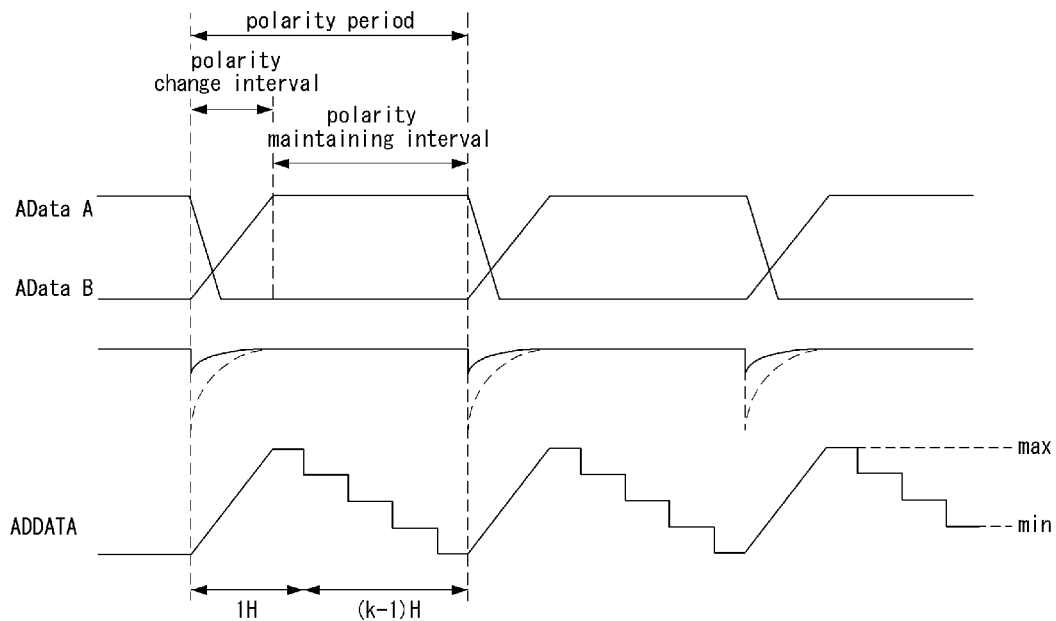
FIG. 7 is a view illustrating timing of a data voltage and a compensation data voltage according to an embodiment of the present invention.

FIG. 7 is a timing diagram illustrating a change in polarity of a data voltage and an output of a compensation data voltage corresponding thereto.

In FIG. 7, a first data voltage Adata A and a second data voltage Adata B are data voltages provided to data lines DL in columns adjacent to each other. Polarities of the first and second data voltages Adata A and Adata B are maintained during a polarity maintaining interval and reversed during a polarity change interval of a next polarity period.

The compensation data voltage ADDATA starts to be output at a point in time at which the polarities of the first and second data voltages Adata A and Adata B are changed, and rapidly rises to a predetermined level. The compensation data voltage ADDATA, which has risen to a preset maximum voltage level, gradually falls until before the polarities start to be changed.

The compensation data voltage ADDATA whose voltage level rapidly rises at a voltage change time rapidly charges a compensation capacitor Cdc. If the voltage level of the compensation data voltage ADDATA is rapidly lowered, negative polarity ripples may be generated in the common voltage, and thus, the voltage level of the compensation data voltage ADDATA slowly falls. For example, when a polarity of the data voltage ADTA is reversed in every k horizontal period kH (k is a natural number ranging from 2 to m/2), a voltage level of the compensation data voltage ADDATA rapidly rises during a first horizontal period 1H and gradually falls during a (k−1)th horizontal period (k−1)H.

Figure 8:
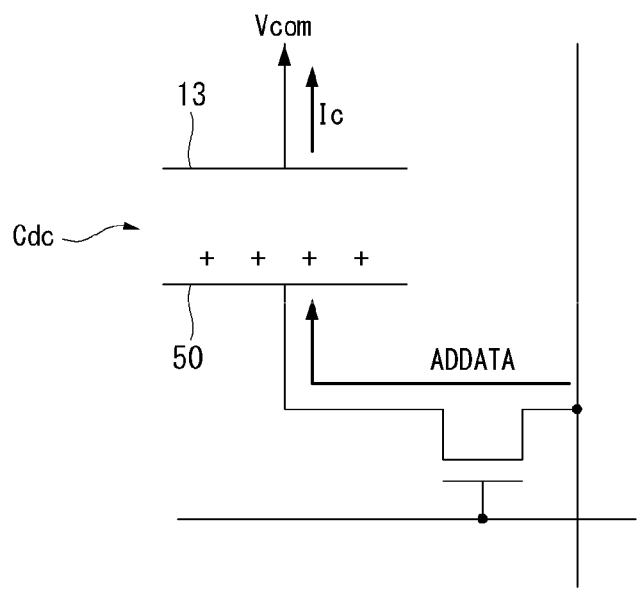
FIG. 8 is a view illustrating a ripple cancellation phenomenon of a common voltage according to an embodiment of the present invention.

The compensation data voltage ADDATA whose voltage level rapidly rises during the rising interval is provided to the metal pattern 50. When the metal pattern 50 receives the compensation data voltage ADDATA, the compensation capacitor Cdc is charged with the compensation data voltage ADDATA as illustrated in FIG. 8. Since the metal pattern 50 is charged by the positive polarity compensation data voltage ADDATA, a compensation current Ic is induced in a direction toward the dummy common electrode 13 from the metal pattern 50 in the compensation capacitor Cdc. The compensation current Ic induced during the process of charging the compensation capacitor Cdc flows to the common electrode 15 through the dummy common electrode 13. Thus, negative polarity ripples generated in the common electrode 15 are canceled out.

Since the ripples generated in the common electrode 15 are instantaneously generated during a period in which the polarities of the first and second data voltages Adata A and Adata B are changed, the compensation data voltage ADDATA for canceling the ripples are set such that a voltage level thereof is significantly changed during a short period of time. That is, a minimum voltage level min and a maximum voltage level max of the compensation data voltage ADDATA may be set as the lowest value and the highest value of the data voltage, respectively. For example, the minimum voltage level min of the compensation data ADDATA may be set to a voltage level corresponding to a gray level 0, and the maximum voltage level max may be set to a voltage level corresponding to a gray level 255.

Capacitance of the compensation capacitor Cdc is equal to or greater than the sum of the liquid crystal capacitors Clc of the horizontal lines, and is set to equal to or less than 1.5 times the sum of the capacitances of the liquid crystal capacitors. As described above, the compensation capacitor Cdc cancels out ripples of the common electrode 151 using that the induced current within the compensation capacitor Cdc flows to the common electrode 15. Thus, in order to supply a compensation current Ic to every pixel P connected to one horizontal line, capacitance of the compensation capacitor Cdc is equal to or greater than the sum of the capacitances of the liquid crystal capacitors. A maximum value of the capacitances of the compensation capacitor Cdc may be equal to or greater than the sum of the capacitances of the liquid crystal capacitors, and a maximum value thereof may vary according to design margins of the compensation capacitor Cdc. For example, a maximum value of the capacitances of the compensation capacitors Cdc may be set to a value equal to or smaller than 1.5 times the sum of the capacitances of the liquid crystal capacitors.

A polarity of the compensation data voltage ADDATA may be changed according to potentials of ripples of the common voltage Vcom, or may be maintained at a predetermined positive polarity voltage level as illustrated in FIG. 7. The reason why the potential of the compensation data voltage ADDATA is maintained to have the positive polarity as illustrated in FIG. 7 is because the ripples of the common voltage Vcom mainly have a negative polarity. The ripples of the common voltage Vcom is proportional to a variation of voltage levels of the first and second data voltages Adata A and Adata B. That is, as illustrated in FIG. 7, the moment polarities of the first and second data voltages Adata A and Adata B are changed from a positive polarity to a negative polarity, a voltage variation per unit time is large, and the moment polarities of the first and second data voltages Adata A and Adata B are changed from a negative polarity to a positive polarity, a voltage variation per unit time is small. Thus, ripples of the common voltage Vcom are severe the moment the polarities of the first and second data voltages Adata A and Adata B are changed to the negative polarity. Since the ripples of the common voltage Vcom are generated mainly as having a negative polarity, the compensation data voltage ADDATA constantly maintains a positive polarity voltage.

Figure 9:
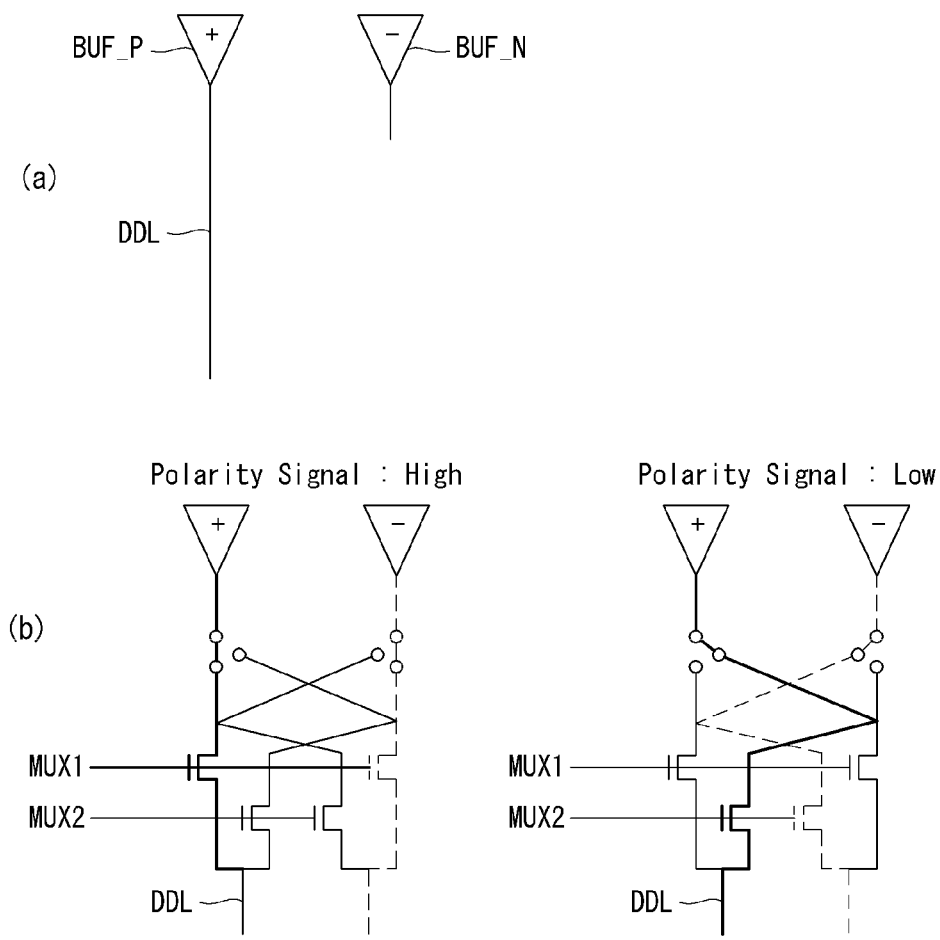
FIG. 9 shows views illustrating an example of an output buffer outputting a compensation data voltage according to an embodiment of the present invention.

In order to maintain the potential of the compensation data voltage ADDATA as having a positive polarity, in the output buffer output the compensation data voltage ADDATA to the dummy data line DATA, only a P buffer BUF_P outputting a positive polarity voltage may be connected to the dummy data line DDL as illustrated in (a) of FIG. 9. Also, a structure in which the P buffer BUF_P and the dummy data line DDL are connected using a first multiplexer MUX1 when a polarity reverse signal POL is a high signal and an N buffer BUF_N and the dummy data line DDL are connected using a second multiplexer MUX2 when the polarity reverse signal POL is a low signal, as illustrated in (b) of FIG. 9, may be used.

As described above, in the LCD device according to an embodiment of the present invention, ripples generated in the common voltage Vcom are suppressed by using the compensation data voltage ADDATA charged in the compensation capacitor Cdc during the polarity change interval. In particular, since the compensation data voltage ADDATA is switched by a gate pulse provided to each horizontal line so as to be supplied to the compensation capacitor Cdc, delay of the ripples of the common voltage Vcom may be reflected for compensation.

The delay phenomenon of the ripples of the common voltage Vcom results from a delay phenomenon of the data voltage ADATA as illustrated in FIG. 10. The data voltage ADATA is output from the data driver 240 and supplied from a first horizontal line HL1 to an mth horizontal line HLm. A data voltage supplied to a jth horizontal line HLj positioned away from the data driver 240 is delayed by Δt at a point in time at which the jth horizontal period jH starts due to the data delay phenomenon. Thus, the ripples of the common voltage Vcom are also delayed by Δt.

In the LCD device according to an embodiment of the present invention, the compensation data voltage ADDATA is delayed by the same timing and synchronized with a timing at which the data voltage ADATA is provided to the pixel P by a gate pulse, so as to be provided to the compensation capacitor Cdc. Thus, the compensation capacitor Cdc may effectively suppress ripples of the common voltage Vcom in response to a timing at which the ripples of the common voltage Vcom are generated in each horizontal line.

Figure 11:
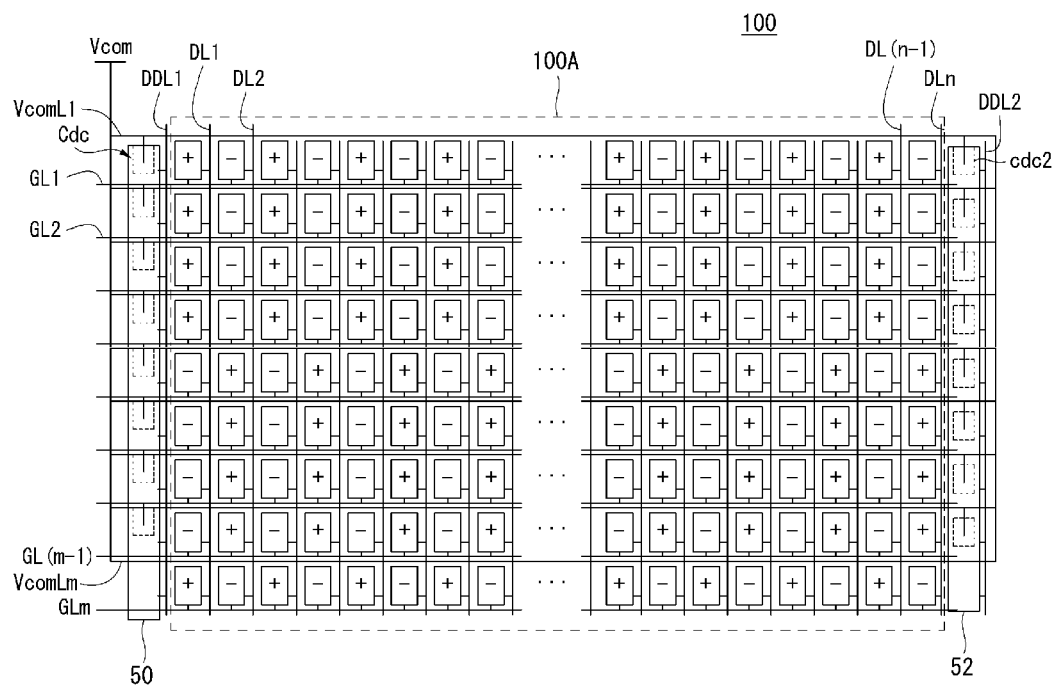
FIG. 11 is a view illustrating a pixel array region according to a second embodiment.

FIG. 11 is a view illustrating a planar structure of a TFT array substrate of a liquid crystal panel according to a second embodiment.

Referring to FIG. 11, in the TFT array substrate of a liquid crystal panel 100 according to the second embodiment, pixels P defined by gate lines GL1 to GLm and data lines DL1 to DLm arranged vertically and horizontally are arranged in a matrix form. First dummy data lines DDL1 and first compensation capacitors Cdc1 are formed to be parallel to the first data line DL1 on one side of a pixel array region 100A. Also, second dummy data lines DDL2 and second compensation capacitors Cdc2 are formed to be parallel to the nth data line DLn on the other side of the pixel array region 100A. In the second embodiment, the same reference numerals will be used for components substantially the same as those of the first embodiment and detailed descriptions thereof will be omitted.

The first and second compensation capacitors Cdc1 and Cdc2 have a dummy common electrode and a metal pattern 50 branched from each of the horizontal common lines VcomL1 to VcomLm as an electrode pair, and are formed in positions outside of the pixel array region 100A. In the second embodiment, since the first and second compensation capacitors Cdc1 and Cdc2 are formed on both sides of the pixel array region 100A, capacitances of the first and second compensation capacitors Cdc1 and Cdc2 may be designed to be smaller than that of a case using a single compensation capacitor. That is, a design margin of the compensation capacitor Cdc may be secured.

In this manner, since ripples of the common voltage are canceled out by a compensation voltage generated when the compensation capacitor is charged, a line-dim phenomenon due to ripples of the common voltage may be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A liquid crystal display (LCD) device comprising:
a liquid crystal panel in which a gate line, a dummy data line, a data line, and pixels are disposed;
a timing controller configured to generate compensation data;
a data driver configured to generate a compensation data voltage based on the compensation data, provide the generated compensation data voltage to the dummy data line, and provide a data voltage for displaying an image to the data line;
a common electrode configured to provide a common voltage to the pixels of the liquid crystal panel; and
a compensation capacitor positioned outside of a pixel array of the liquid crystal panel and charged upon receiving the compensation data voltage,
wherein the compensation capacitor is charged by the compensation data voltage provided during a polarity change interval in which a polarity of the data voltage is reversed, and cancels out ripples generated in the common electrode by a current flow formed in a direction toward the common electrode during the voltage charge process, wherein the compensation data voltage is maintained to have a positive polarity, and wherein a voltage level of the compensation data voltage rises during the polarity change interval and falls during a polarity maintaining interval, and the polarity maintaining interval is maintained to be longer than the polarity change interval.

2. The LCD device of claim 1, further comprising:
a horizontal common line configured to receive the common voltage and supply the received common voltage to the common electrode,
wherein the compensation capacitor comprises:
   a dummy common electrode branched from the horizontal common line;
   a gate insulating layer formed on the dummy common electrode; and
   a metal pattern formed to face the dummy common electrode on the gate insulating layer.

3. The LCD device of claim 2, wherein the gate line provides a gate pulse to the pixels,
wherein the LCD device further comprises:
a transistor configured to include a gate electrode protruding from the gate line, a drain electrode protruding from the dummy data line, and a source electrode formed in a position adjacent to the drain electrode and electrically connected to the metal pattern, and
wherein the compensation capacitor receives the compensation data voltage through the dummy data line in response to the gate pulse.

4. The LCD device of claim 1, wherein capacitance of the compensation capacitor formed in each horizontal line is equal to or greater than a sum of capacitances of liquid crystal capacitors formed in a single horizontal line or is equal to or smaller than 1.5 times a sum of the capacitances of the liquid crystal capacitors.

5. The LCD device of claim 1, wherein when the data voltage is reversed in every k horizontal lines (k is a natural number smaller than ½ of the entire horizontal lines), the polarity change interval of the compensation data voltage is set to 1 horizontal period, and the polarity maintaining interval is set to (k−1) horizontal period.

6. The LCD device of claim 1, wherein a minimum voltage level of the compensation data voltage is a voltage level of a gray level 0, and a maximum voltage level of the compensation data voltage is a voltage level of a gray level 255.

7. The LCD device of claim 1, wherein the data driver maintains a polarity of compensation data voltage, as the positive polarity.

* * * * *